United States Patent Office 3,053,900
Patented Sept. 11, 1962

3,053,900
PREPARATION OF PHOSPHINE SULFIDES
Harold James Harwood and Kenneth A. Pollart, Dayton, Ohio, assignors to Monsanto Chemical Company, St. Louis, Mo., a corporation of Delaware
No Drawing. Filed July 29, 1959, Ser. No. 828,044
5 Claims. (Cl. 260—606.5)

This invention relates to the preparation of organic compounds of phosphorus and more particularly provides a new and valuable method of preparing phosphine sulphides.

According to the invention, trihydrocarbylphosphine-sulfides are obtained by the reaction of a dihydrocarbyl-phosphinothioic halide with a hydrocarbylmagnesium halide substantially according to the scheme:

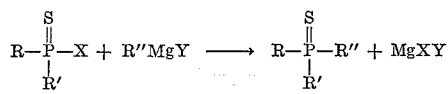

wherein R, R' and R'' are hydrocarbyl radicals free of aliphatic unsaturation and containing from 1 to 8 carbon atoms and X is selected from the class consisting of chlorine and bromine and Y is halogen.

In prior art the trihydrocarbyl phosphine sulfides were prepared, e.g., by reaction of the corresponding phosphines with sulfur or by an Arbuzov rearrangement reaction whereby a hydrocarbyl dihydrocarbylphosphinothioite $R_2PSR'$ was reacted with a hydrocarbyl halide. Neither method was of generally satisfactory applicability, however. Working with phosphines made imperative the very careful exclusion of air or oxygen, and the aliphatic phosphines were difficultly available. When working with the phosphinothioites, phosphonium halides appeared to be formed in predominant quantities, the desired trihydrocarbylphosphine sulfides being obtained in only low yields if at all.

The reaction of thiophosphoryl chloride with hydrocarbyl magnesium halides is known to given good yields of tetrahydrocarbyl bi(phosphine sulfides), see e.g., Kabachinik et al., Izvestia Akad. Nauk (1949) 56, and Reinhardt et al., Chem. Berichte 90 1656 (1957), thus:

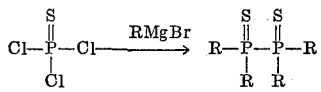

In view of the above, diphosphines would be expected to be formed, generally, with the hydrocarbylmagnesium halides and compounds having the grouping

The dihydrocarbylphosphinothioic halides which are presently employed for the preparation of the trihydro-carbylphosphine sulfides are obtainable in good yields by halogenating the tetrahydrocarbyl bi(phosphine sulfides) thus

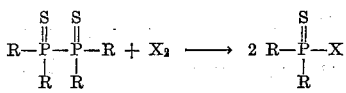

where X is chlorine or bromine. They are also obtainable by heating dihydrocarbyl chlorophosphines with sulfur (V. M. Plets, Organicheskie Soedinenia Fosfora, Moscow, p. 177).

Compounds obtained by reacting the phosphinothioic halides with the hydrocarbylmagnesium halides are trihydrocarbylphosphine sulfides wherein the hydrocarbyl radical is free of aliphatic unsaturation and contains from 1 to 12 carbon atoms. Thus, reaction of a dialkylphosphinothioic chloride with an alkylmagnesium halide gives the simple trialkylphosphine sulfides, e.g., trimethyl-, triethyl-, tripropyl-, triisopropyl-, tributyl-, tripentyl-, trihexyl-, triheptyl-, trioctyl, tris(2-ethylhexyl)-, triisobutyl or tri- tert-butylphosphine sulfide when the alkyl radicals of the phosphinothioic halide and of the alkylmagnesium halide are the same. The mixed trialkylphosphine sulfides are obtained when there are present dissimilar radicals in either the dialkylphosphinothioic halide or/and when the alkyl radical of the alkylmagnesium halide is different from one or both of the alkyl radicals of the phosphino-thioic halide, e.g., dimethylpropylphosphine sulfide is obtained from dimethylphosphinothioic chloride and propylmagnesium bromide or chloride, butyldiethylphosphine sulfide is obtained from diethylphosphinothioic bromide and butylmagnesium chloride or iodide, and butyl-ethyloctylphosphine sulfide is obtained from butylethylphosphinothioic chloride and octylmagnesium iodide or bromide. The hydrocarbylmagnesium halide may be a bromide, iodide or a chloride.

Shown below are other trihydrocarbylphosphines which are provided by the present invention according to the reaction:

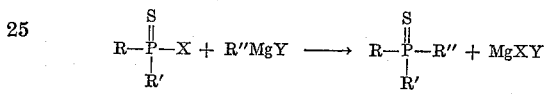

| R= | R'= | R''= |
|---|---|---|
| methyl | methyl | phenyl |
| benzyl | benzyl | ethyl |
| phenyl | phenyl | butyl |
| p-tolyl | p-tolyl | methyl |
| pentyl | pentyl | phenyl |
| butyl | butyl | cyclohexyl |
| phenyl | phenyl | phenyl |
| propyl | propyl | 4-ethylphenyl |
| phenyl | phenyl | benzyl |
| ethyl | ethyl | cyclopropyl |
| Do | isopropyl | phenyl |
| 2-phenylethyl | 2-phenylethyl | hexyl |
| cyclopentyl | cyclopentyl | phenyl |
| butyl | butyl | 4-isopropylphenyl |
| methyl | methyl | 2-methylcyclohexyl |
| isopropyl | isopropyl | 4-methylbenzyl |
| benzyl | benzyl | benzyl |
| 2-ethylhexyl | 2-ethylhexyl | phenyl |
| 2-tolyl | 2-tolyl | 2-tolyl |
| 2-ethylhexyl | 2-ethylhexyl | cyclopropyl |

The presently provided process is particularly valuable in that it provides a facile method of preparing the mixed trihydrocarbylphosphine sulfides.

Reaction of the dihydrocarbylphosphinothioic chloride or bromide with the hydrocarbylmagnseium halide proceeds readily upon contacting the phosphorus compound with the magnesium compound at ordinary or slightly increased or decreased temperature in the presence of an inert diluent or solvent and hydrolyzing the resulting reaction mixture by treatment with dilute aqueous mineral acid. Inert diluents or solvents useful for the present purpose are, e.g., ethyl ether, isopropyl ether, dioxane, etc. Mineral acids useful for the hydrolysis step are, e.g., sulfuric, hydrochloric, and phosphoric acids.

The progress of the reaction mixture can readily be followed subsequent to mixing of the phosphinothioic halide with the magnesium compound, by noting a change in viscosity and/or stratification of the reaction mixture. Generally, to assure complete reaction prior to the hydrolysis step the reaction mixture is allowed to stand until stratification has taken place. The reaction proceeds by the formation of a complex of the phosphino-thioic halide and the magnesium compound and generally the formation of such a complex is accompanied by at least slight heat evolution. Completion of complex formation can then be ascertained by noting cessation of exothermal activity.

Hydrolysis of the complex is generally effected by pouring the complex product into slightly acidified ice-water, e.g., dilute aqueous sulfuric or hydrochloric acid which has been cooled to from, say, 2° C. to 10° C. The trihydrocarbylphosphine sulfide is then isolated from the hydrolysis mixture by allowing the mixture to stratify, decanting the organic layer, and evaporating the solvent from said layer. However, as will be apparent to those skilled in the art, other hydrolysis and isolating procedures may be employed.

The invention is further illustrated by, but not limited to, the following examples.

Example 1

To an ice-cooled solution of 33.3 ml. of 3 M phenylmagnesium bromide in 75 ml. of dry ether there was added during ten minutes, with stirring, a solution of 16.4 g. (0.095 mole) of dimethylphosphinothioic bromide in 75 ml. of ether. The whole was then allowed to stand overnight at room temperature, poured into ice-cold, 10% sulfuric acid and the resulting mixture allowed to stratify.

The ether layer was decanted and the aqueous layer extracted with fresh ether and the extract washed with water. The combined ether layer and extract were dried over sodium sulfate. After removing ether from the dried product there was obtained a light yellow oil which solidified upon cooling to give 14.3 g. of material which after two crystallizations from hexane gave the substantially pure dimethylphenylphosphine sulfide, white needles, M.P. 45.0–46.3° C., which analyzed as follows:

|  | Found | Calcd. for $C_8H_{11}PS$ |
|---|---|---|
| Percent C | 56.45 | 56.8 |
| Percent H | 6.55 | 6.4 |
| Percent S | 19.12 | 18.7 |

Example 2

Dimethylphospinothioic bromide (0.058 mole) in 15 ml. of ether was added dropwise to 0.1 mole of methylmagnesium bromide in ether. The temperature of the reaction mixture was maintained below 10° C. during the addition, and then allowed to attain room temperature. After it was stirred overnight, the reaction mixture was hydrolyzed by pouring into a mixture of ice and hydrochloric acid. The ether layer which formed was decanted, and the residual aqueous layer extracted with fresh ether. Evaporation of the combined ether extracts gave 5.6 g. (90% theoretical yield) of the trimethylphosphine sulfide, M.P. 155–6° C. It gave an infared spectra identical with that reported by F. N. Hooge et al., Rec. Trav. Chem. 77 911 (1958).

Example 3

Dimethylphosphinothioic chloride (9 g., 0.076 mole) in 50 ml. of ether was gradually added, with stirring, to 50 ml. of a 3 M solution of methylmagnesium bromide in ether. When the resulting reaction mixture had separated into two layers it was poured into a mixture of ice and dilute sulfuric acid. The resulting ether layer was decanted, the residual water layer was extracted repeatedly with fresh ether and the ether layer and extracts were combined. After drying the combined extracts over sodium sulfate, ether was removed to obtain the crude trimethylphosphine sulfide. It was purified by recrystallizing from cyclohexane to give 6.5 g. (79% theoretical yield) of the substantially pure trimethylphosphine sulfide.

What we claim is:

1. The method which comprises reacting a phosphinothioic halide of the formula

where R and R' are hydrocarbon radicals which are free of aliphatic unsaturation and contain from 1 to 8 carbon atoms, X is selected from the class consisting of chlorine and bromine with a magnesium compound of the formula R″MgY wherein R″ is a hydrocarbyl radical which is free of aliphatic unsaturation and contains from 1 to 8 carbon atoms and Y is halogen, hydrolyzing the resulting reaction product, and recovering from the hydrolyzed product a trihydrocarbylphosphine sulfide of the formula

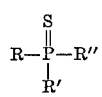

in which R, R' and R″ are as herein defined.

2. The method which comprises reacting, in the presence of an inert diluent, a dialkylphosphinothioic bromide having from 1 to 8 carbon atoms in each alkyl radical, with an alkylmagnesium halide having from 1 to 8 carbon atoms in the alkyl radical, hydrolyzing the resulting reaction product with dilute aqueous mineral acid, and recovering from the hydrolyzed product a trialkylphosphine sulfide wherein each alkyl radical is as herein defined.

3. The method which comprises reacting dimethylphosphinothioic bromide with methylmagnesium bromide in the presence of ether as a diluent, hydrolyzing the resulting reaction product with dilute aqueous mineral acid, and recovering trimethylphosphine sulfide from the hydrolyzed product.

4. The method which comprises reacting dimethylphosphinothioic chloride with methylmagnesium bromide in the presence of ether as a diluent, hydrolyzing the resulting reaction product with dilute aqueous mineral acid, and recovering trimethylphosphine sulfide from the hydrolyzed product.

5. The method which comprises reacting dimethylphosphinothioic chloride with phenylmagnesium bromide in the presence of ether as a diluent, hydrolyzing the resulting reaction product with dilute aqueous mineral acid, and recovering dimethylphenylphosphine sulfide from the hydrolyzed product.

References Cited in the file of this patent

UNITED STATES PATENTS 2,642,461     Morris et al.     June 16, 1953

OTHER REFERENCES

Kharasch et al., Grignard Reactions of Non-Metallic Substances, Prentice-Hall, Inc., New York (1954), pages 1343 to 1344.

Horner et al. German application 1,044,813, printed November 27, 1958 (KL 12o26/01) (4 pages spec.).